(12) United States Patent
Camacho et al.

(10) Patent No.: US 11,745,718 B2
(45) Date of Patent: Sep. 5, 2023

(54) VEHICLE PEDAL ACTUATOR WITH CONTROL UNIT

(71) Applicant: MOC Products Company, Inc., Pacoima, CA (US)

(72) Inventors: Michael J. Camacho, Rancho Cucamonga, CA (US); Michael David Klugman, Valencia, CA (US); Dean Austin Puett, III, Palmdale, CA (US); Vic Estrada, North Lincoln, CA (US)

(73) Assignee: MOC Products Company, Inc., Pacoima, CA (US)

( * ) Notice: Subject to any disclaimer, the term of this patent is extended or adjusted under 35 U.S.C. 154(b) by 29 days.

(21) Appl. No.: 17/223,440

(22) Filed: Apr. 6, 2021

(65) Prior Publication Data
US 2021/0318711 A1  Oct. 14, 2021

Related U.S. Application Data

(60) Provisional application No. 63/008,401, filed on Apr. 10, 2020.

(51) Int. Cl.
*G05G 1/54* (2008.04)
*B60K 26/02* (2006.01)
(Continued)

(52) U.S. Cl.
CPC ............ *B60T 17/223* (2013.01); *B60K 26/02* (2013.01); *G05G 1/54* (2013.01)

(58) Field of Classification Search
CPC . G05G 1/48; G05G 1/487; G05G 1/54; B60K 26/02; B60K 2026/025; B60K 2026/026; B60K 2026/028; B60T 17/223
See application file for complete search history.

(56) References Cited

U.S. PATENT DOCUMENTS 2,124,100 A * 7/1938 Pinnock ................. G05G 1/487
74/526
4,186,595 A * 2/1980 Domitter .............. B60T 17/223
73/132

(Continued)

FOREIGN PATENT DOCUMENTS

FR  2793204 A1 * 11/2000
KR  20010054639 A * 7/2001
(Continued)

*Primary Examiner* — Adam D Rogers
(74) *Attorney, Agent, or Firm* — FULWIDER PATTON LLP (57) ABSTRACT

The present invention is an actuator that may be used to service a vehicle, where the actuator engages an accelerator pedal of the vehicle and can control the pedal remotely using a vehicle service module or tech station that automatically carries out a vehicle engine service. The actuator comprises a member that uses a linear actuator to engage the vehicle's accelerator pedal and controls the speed of the engine using feedback directly from the engine's ECU or other direct engine input. The pedal actuator include input cables that receive signals from the remote service module to adjust the speed of the engine to optimize a service performance. The data from the engine can include temperature, pressure, RPMs, and various other inputs depending on the service to be performed. The present invention allows the service technician to control the engine without the need for a second tech to apply pressure to the accelerator and monitor the engine speed.

8 Claims, 6 Drawing Sheets

(51) Int. Cl.
  *B60T 17/18* (2006.01)
  *B60T 17/22* (2006.01)

(56) References Cited

U.S. PATENT DOCUMENTS

| | | | | |
|---|---|---|---|---|
| 5,012,689 | A * | 5/1991 | Smith | G05G 1/54 |
| | | | | 74/89.17 |
| 5,299,668 | A * | 4/1994 | Youngers | B60T 17/223 |
| | | | | 74/532 |
| 5,417,127 | A * | 5/1995 | Bueti | B60K 26/00 |
| | | | | 74/532 |
| 6,095,619 | A * | 8/2000 | Granata | B60T 7/04 |
| | | | | 303/7 |
| 6,363,774 | B2 * | 4/2002 | Duff | B60T 17/221 |
| | | | | 73/132 |
| 6,745,653 | B2 * | 6/2004 | Kurtz | B25B 27/0035 |
| | | | | 81/177.2 |
| 8,607,602 | B1 * | 12/2013 | Okoye | G05G 5/00 |
| | | | | 70/201 |
| 9,050,960 | B2 * | 6/2015 | Neu | G05G 1/38 |
| 9,103,737 | B2 * | 8/2015 | Vaeretti | B60T 17/223 |
| 9,140,626 | B2 * | 9/2015 | Amirpour | G01M 17/007 |
| 9,886,053 | B1 * | 2/2018 | Buse | F16H 25/2015 |
| 10,175,713 | B1 * | 1/2019 | Howell | B60T 7/06 |
| 11,648,928 | B2 * | 5/2023 | Whitt | B60T 17/223 |
| | | | | 74/532 |
| 2004/0255688 | A1 * | 12/2004 | Ok | G01L 5/225 |
| | | | | 73/818 |
| 2009/0056432 | A1 * | 3/2009 | Steininger | G01L 5/28 |
| | | | | 73/132 |
| 2012/0187358 | A1 * | 7/2012 | Lee | B60T 17/222 |
| | | | | 254/93 VA |
| 2013/0247554 | A1 * | 9/2013 | Cooper | G05G 1/487 |
| | | | | 60/407 |
| 2015/0336557 | A1 * | 11/2015 | McNeil, Sr. | B60T 17/223 |
| | | | | 254/104 |
| 2019/0135260 | A1 * | 5/2019 | Graves | B60T 17/223 |
| 2020/0324650 | A1 * | 10/2020 | Erwin | G07C 5/085 |
| 2023/0136652 | A1 * | 5/2023 | Malone | B60T 17/221 |
| | | | | 73/121 |

FOREIGN PATENT DOCUMENTS

| | | | |
|---|---|---|---|
| KR | 101283357 | B1 * | 7/2013 |
| WO | WO-8900543 | A1 * | 1/1989 |

\* cited by examiner

VEHICLE PEDAL ACTUATOR WITH CONTROL UNIT

CROSS-REFERENCES TO RELATED APPLICATIONS

This patent application claims priority to U.S. Provisional Patent Application Ser. No. 63/008,401 filed Apr. 10, 2020, the contents of which is wholly incorporated by reference herein.

BACKGROUND

In the vehicle service industry, it is typical for a vehicle's engine be engaged and running while certain diagnostic, maintenance, or repair functions are being performed. When the vehicle's engine is operating, the various components can be observed, fluids replaced, exhaust measured, diagnostic evaluations conducted, etc. This process historically required two service technicians, one to perform the test and one to operate the engine controls. To make the process more efficient, the second technician was replaced with a mechanism that physically depressed the vehicle's accelerator so that a single technician could perform the service. However, where the service requires that the speed be adjusted, a device that merely depresses the accelerator cannot be substituted for the second service technician, who must adjust the engine speed while the other technician performs the service. To overcome this, there have been attempts in the past to design tools that will engage the accelerator automatically so that the need for a service tech to perform this task is removed.

Cooper, US Patent Publication No 2013/0247554 describes a remotely controlled vehicle pedal actuator that remotely controls the vehicle's pedals (brake, clutch, or accelerator) using a pneumatic device. When pneumatic pressure is applied to the device the vehicle pedal depresses and when pneumatic pressure is removed the pedal retracts. Howell et al., U.S. Pat. No. 10,175,713 teaches a tool used to accelerate or brake a vehicle using a support tube connected to the steering column. A position sensor is coupled to the control tube, and a rotational element cooperates with the position sensor to adjust the position of the brake or accelerator pedals. Smith, U.S. Pat. No. 5,012,689 teaches a foot pedal actuator that connects to the driver seat of a vehicle and includes an extension assembly for engaging the accelerator pedal of the vehicle. Domitter, U.S. Pat. No. 4,186,595 teaches a brake pedal testing apparatus that connects to the vehicle's steering column. Pirrello teaches a test apparatus for depressing a vehicle's brake and accelerator pedals during servings.

While the foregoing devices each have their own advantages and disadvantages, there is still a need in the art for a easily installable, easily detachable accelerator actuator for engaging a vehicle's control pedal (accelerator, brake, or clutch) that is adaptable to almost any vehicle and can accurately control the engine speed. The present invention solves this need.

SUMMARY OF THE INVENTION

The present invention is an actuator that may be used to service a vehicle, where the actuator engages an accelerator pedal of the vehicle and controls the pedal's position remotely using a vehicle service module or tech station that automatically carries out a vehicle engine service. The actuator comprises an elongating rod that at a first end forms a hook or latch that bears against the vehicle's steering wheel for support, and at an opposite end is a pedal plate configured to press against and move the vehicle's accelerator (or brake pedal). In between the first and second ends is a linear actuator that expands the actuator to move the vehicle's accelerator pedal and to control the speed of the engine using feedback directly from the engine's ECU or other direct engine input. The pedal actuator may include input cables that receive signals from the remote service module to adjust the speed of the engine to optimize a service performance, or such signals may be sent wirelessly to the controller. The data supplied from the vehicle's engine can include temperature, pressure, RPMs, speed, and various other inputs depending on the service to be performed. The present invention allows the service technician to control the engine without the need for a second tech to apply pressure to the accelerator and monitor the engine speed. In an alternative embodiment, the actuator can also operate a brake pedal as part of a brake service where the pressure applied on the pedal is controlled remotely by the service tech.

These and other features of the invention will best be understood with reference to the drawings and the detailed description of the inventors' preferred embodiments set forth below.

DETAILED DESCRIPTION OF THE PREFERRED EMBODIMENTS

Figure 1:
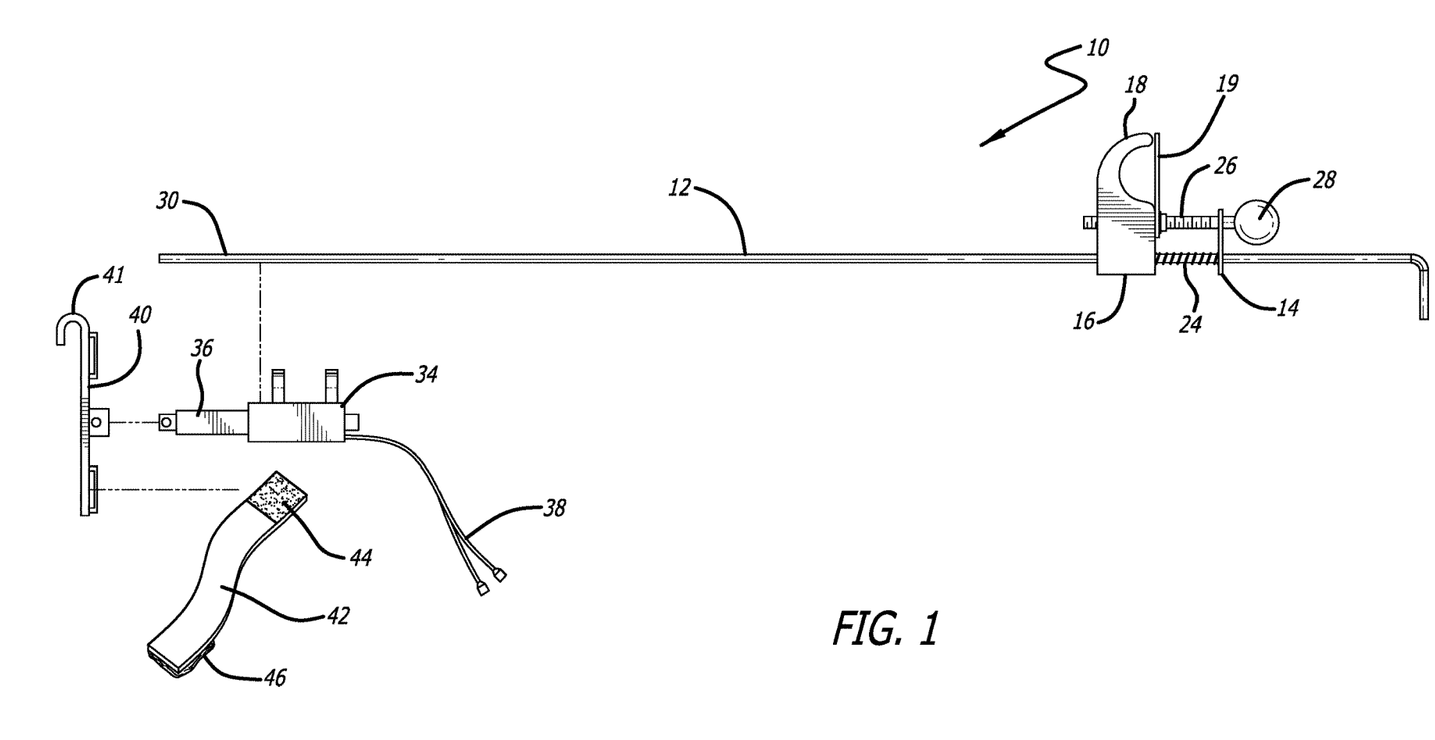
FIG. 1 is a side view of a first embodiment of the present invention.

FIG. 1 illustrates a first preferred embodiment of the present invention, showing a vehicle pedal actuator 10. The actuator 10 comprises an elongate rod 12 that includes a bar 14 rigidly fixed thereto adjacent a proximal end. Mounted on the rod 12 for slidable displacement is a block 16 having a C-shaped projection 18 that is used to hook onto and engage the steering wheel 32 of a vehicle 20. Opposite the C-shaped projection 18, in a preferred embodiment a support bar 19 may be used to bear against the other side of the steering wheel 32 to help tighten and secure the pedal actuator 10 to the vehicle's steering wheel. A spring 24 is located on the rod 12 between the bar 14 and the block 16, biasing the block 16 away from the bar 14 in the distal direction. Also passing through the bar 14 and the block 16 is a threaded member 26 having a spherical grip 28 on a first end. The threaded member 26 passes through the block 16 at a threaded passage, such that when the threaded member 26 is rotated via the spherical grip 28 the threaded member will move the block 16 proximally against the bias of the spring 24 or distally with the bias of the spring to tailor the fit of the pedal actuator 10 to the particular vehicle. That is, the threaded member 26 controls the position of the block 16 and can be used to adjust the distance between the C-shaped end 18 of the block 16 and a distal end 30 of the elongate rod 12. This adjustment mechanism allows the pedal actuator 10 to be used with any vehicle. The distance between the vehicle's pedal and the steering wheel determines the length of the pedal actuator 10, which in turn is set using the threaded member 26 when the C-shaped end 18 is placed under the vehicle's steering wheel 32 and the distal end 30 is engaged with the vehicle pedal. The threaded member 26 is rotated in the appropriate direction until a firm connection is established between the steering wheel 32 and the accelerator pedal 50 (or brake pedal) of the vehicle.

Attached at the distal end 30 of the rod 12 is a linear actuator 34 that includes a housing, a motor (not shown), and an extendable shaft 36 that can be positioned using a controller 100. The controller 100 may be incorporated within the housing of the linear actuator 34, or it may be separate from the linear actuator and provide signals (wired or wirelessly) to control the position of the extendable shaft 36. The controller 100 receives signals such as by cables 38 from the vehicle's engine control unit (ECU), which in turn is processed by the controller 100 to manage the linear actuator 34 (alternatively, the signals can be delivered remotely such as by a wireless connection such as bluetooth or WiFi). The controller 100 adjusts the position of the extendable shaft 36, which in turn controls the position of the accelerator pedal 50 of the vehicle through contact with a pedal contact plate 40. The pedal contact plate 40 is connected to the shaft 36 using a fastener or some other connection means, and a strap 42 can be used to wrap around the pedal contact plate 40 and the vehicle pedal 50, where the strap 42 may be secured with hook 44 and loop 46 material to tighten the engagement. The pedal contact plate 40 may curl at one end 41 to hook onto the top of the accelerator pedal (see FIG. 4A) and include belt loop type structures on the back of the plate 40 where the straps 42 are inserted to better secure the pedal 50 to the plate 40.

Figure 2:
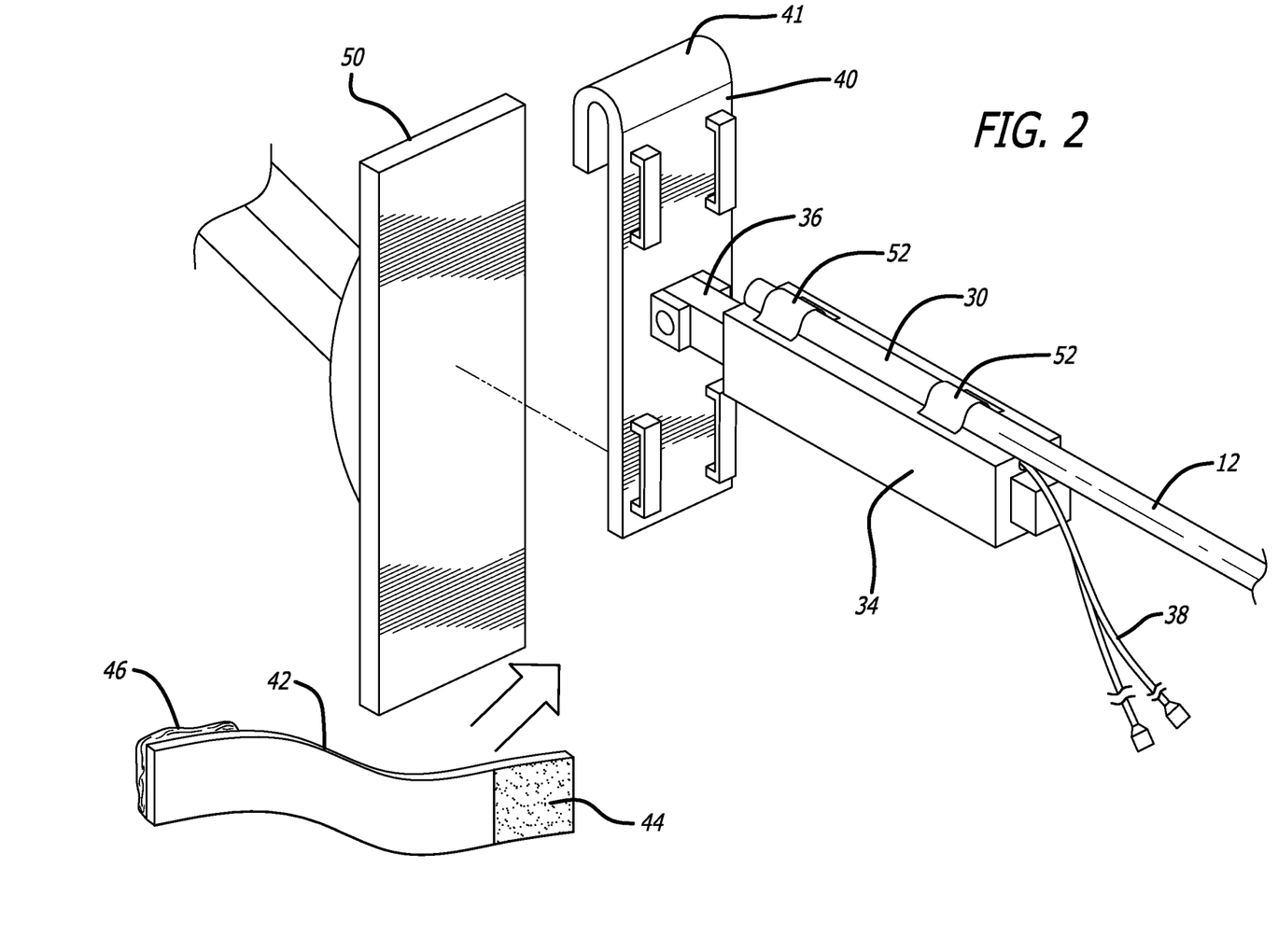
FIG. 2 is an elevated, perspective view of the foot plate and foot pedal engagement.

FIG. 2 shows the engagement of the pedal contact plate 40 with the vehicle's accelerator pedal 50. The straps 42 wrap around both the plate 40 and the pedal 50 so that when the pedal contact plate 40 withdraws the pedal 50 withdraws as well. In this manner, the position of the accelerator pedal 50 is wholly controlled by the extension of the shaft 36 of the linear actuator 34, which in turn is controlled locally or remotely by the controller 100. The linear actuator 34 may be mounted to the rod 12 using brackets 52, and the input leads 38 are shown extending from the linear actuator 34 where the controller 100 is part of the linear actuator 34. The plate 40 is mounted to the shaft 36 at a pair of lugs 37 and a fastener or rivet (not shown).

Figure 3:
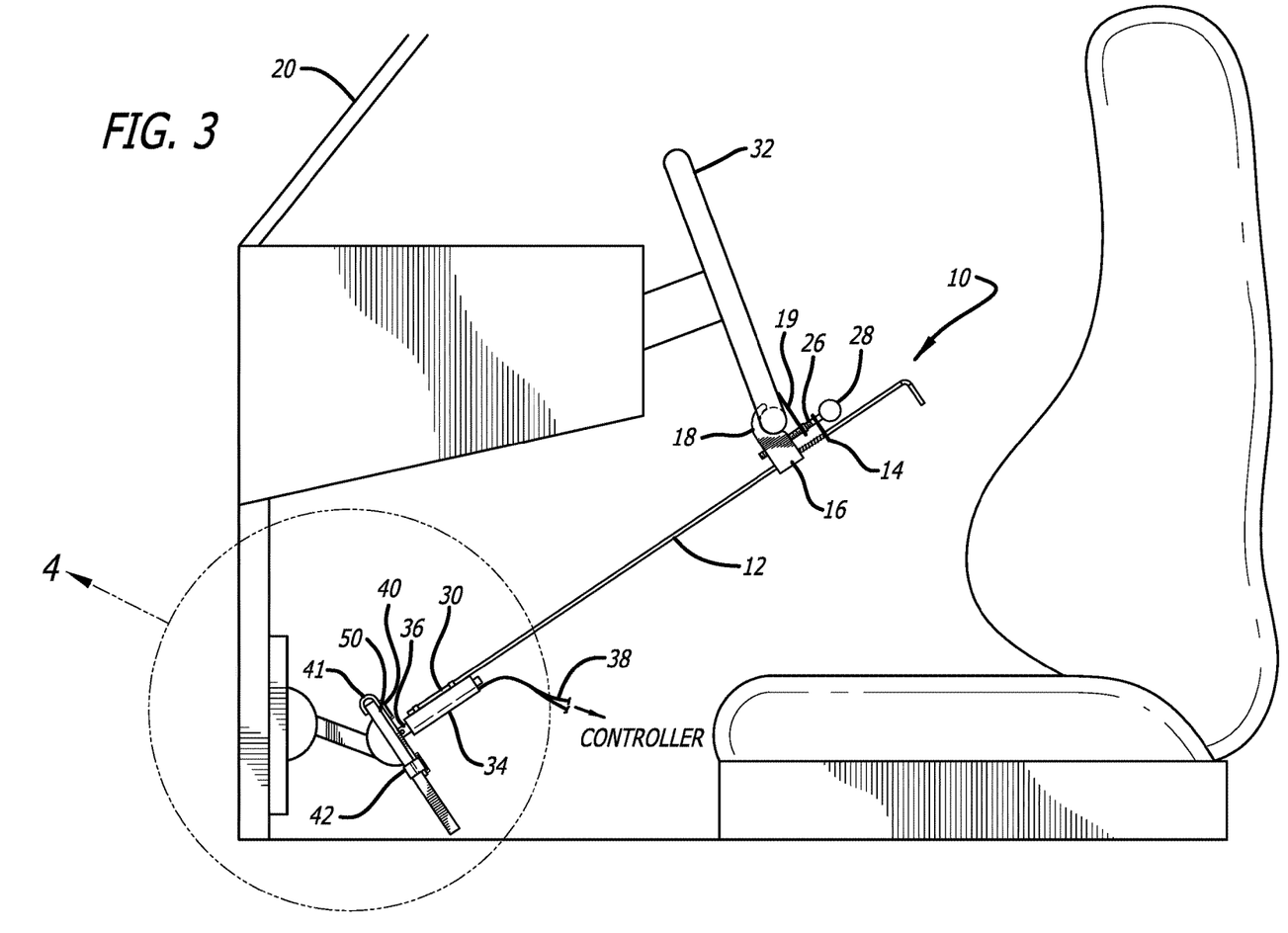
FIG. 3 is a side view of the embodiment of FIG. 1 engaged on a vehicle.
Figure 4A:
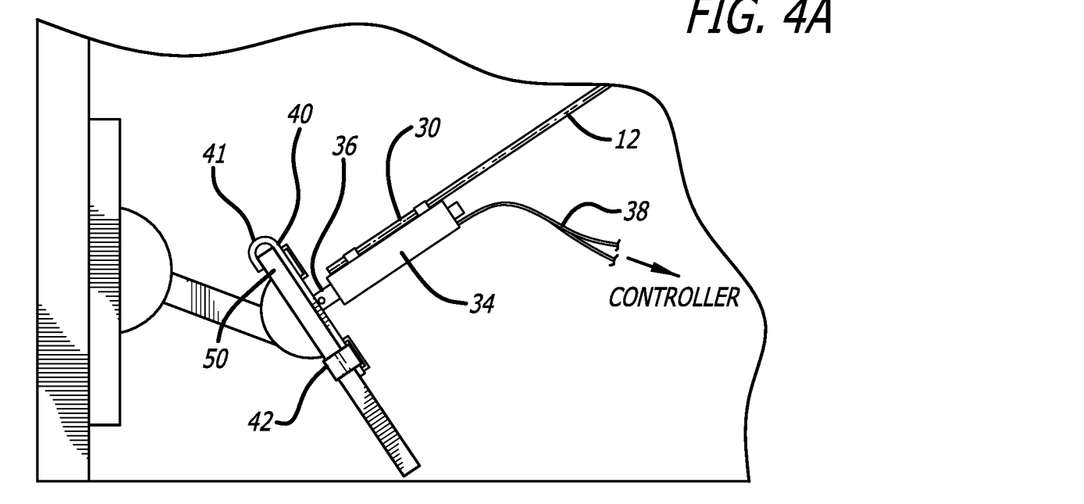
FIG. 4A is an enlarged, side view of the actuator in contact with, but not depressing, a vehicle's pedal.
Figure 4B:
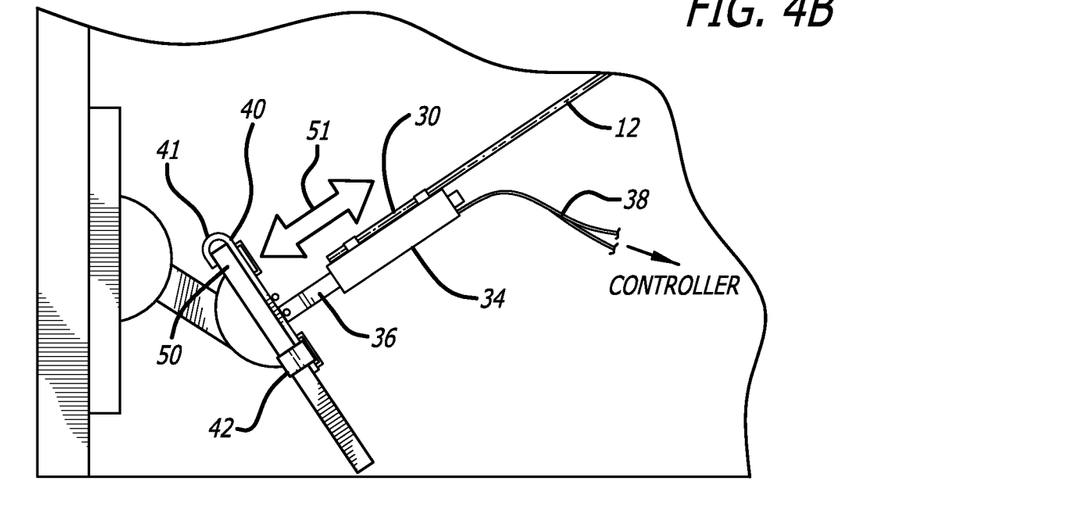
FIG. 4B is an enlarged, side view of the actuator in contact with and depressing the vehicle's pedal.

FIG. 3 shows the vehicle pedal actuator 10 engaged with a vehicle's accelerator pedal 50 while secured to the vehicle's steering wheel 32. The block 16 is engaged with the steering wheel 32 at hook portion 18 after adjustment to establish a fit between the steering wheel 32 and the accelerator pedal 50, and the input leads 38 are connected to a separate controller 100 which sends signals that are used to extend and retract the extendable shaft 36 of the linear actuator 34 to move the accelerator pedal 50 of the vehicle. FIG. 4A shows the position of the extendable shaft 36 such that the accelerator pedal 50 is not depressed, and FIG. 4B shows, after receiving a signal from the remote input device, the linear actuator 34 has extended the extendable shaft 36 to move the accelerator pedal 50 via the pedal contact plate 40. Arrow 51 indicates that the linear actuator 34 can operate in both directions from a rest or home position to accelerate or decelerate the engine as required for the service and to avoid a limp mode situation. The strap 42 is shown wrapped around the combination of the pedal and the contact plate to ensure a consistent contact between the two mating elements.

Figure 5:
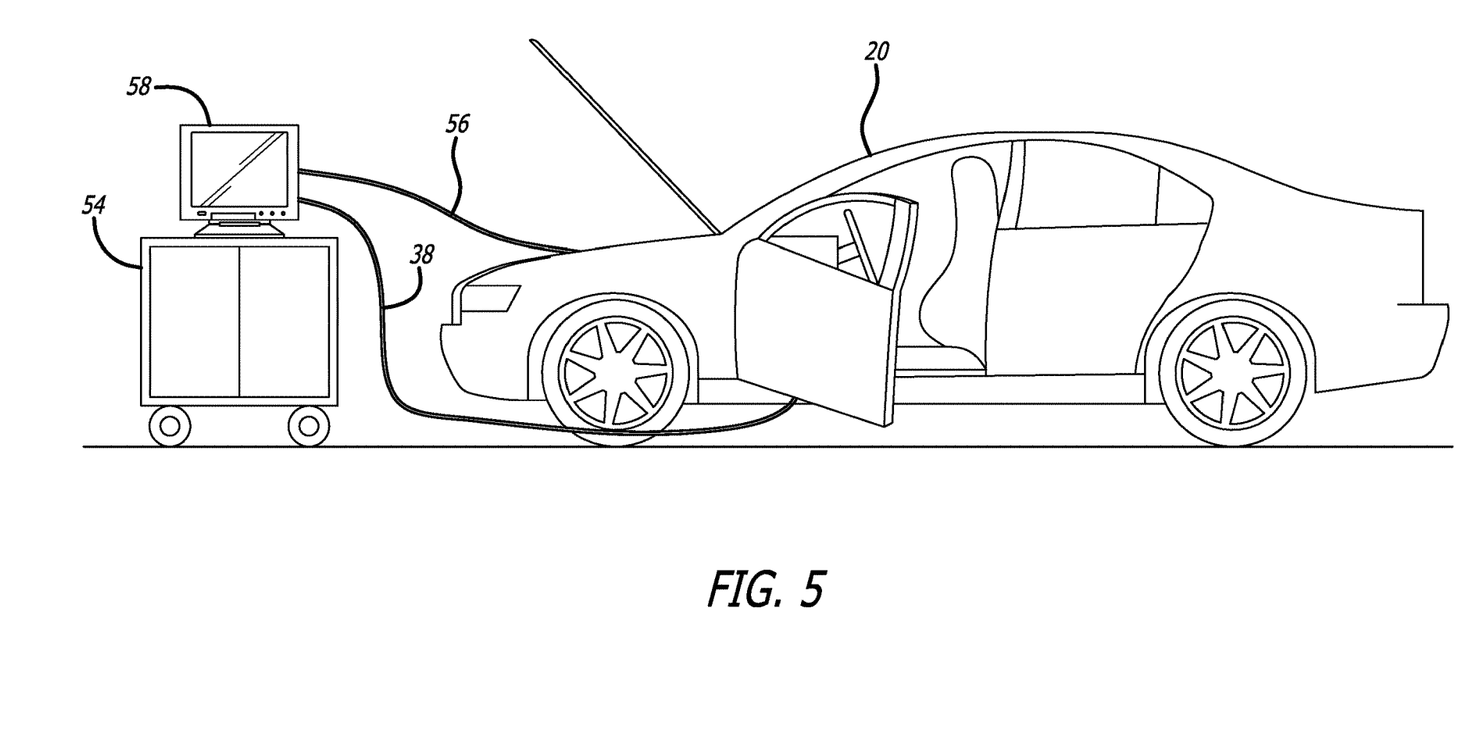
FIG. 5 is a side view of the actuator cooperating with a vehicle control unit to facilitate a vehicle service.

The input leads 38 may alternatively be connected to a remote service tech station 54 such as that shown in FIG. 5. The input leads 38 are coupled to a processor (not shown) that in turn is connected to the vehicle's engine control unit via cables 56. The remote service tech station 54 may include a monitor or display 58 and a processor that receives information from the vehicle's ECU such as RPMs, temperature, pressure, vehicle speed, etc., and based on the service to be performed adjusts the vehicle engine's speed via the accelerator pedal 50. The service can be performed by a single person since the vehicle pedal actuator 10 removes the need for a second service technician to apply pressure to the accelerator during the service.

In one type of pedal actuator, the linear actuator 34 is set to depress the accelerator pedal for a predetermined period of time set forth by the controller 100. The accelerator pedal 50 is set so that the engine starts off at idle to begin the service, and as power from the twelve volt vehicle battery is applied to the pedal actuator 10 the linear actuator shaft 36 extends causing the engine RPM to increase. Once the predetermined time period has elapsed the controller 100 cuts the power to the actuator 10 causing the linear actuator 34 to retract its shaft 36 to its initial position, which in turn causes the vehicle's engine to return to idle.

Another type of pedal actuator of the present invention utilizes linear actuator 34 to retract the accelerator pedal 50 for a predetermined time period set forth by the controller 100. The accelerator pedal 50 is set so that the vehicle engine starts the service at a preset RPM above idle, and as power is applied to the pedal actuator the linear actuator 34 retracts its shaft 36 to cause the engine RPM to reduce to idle. Once the predetermined time period has elapsed the controller 100 cuts the power to the linear actuator 34 to extend its shaft 36 to its initial position, which in turn causes the vehicle's engine to return to the preset RPM.

During testing it has been found that using the actuator starting in an extended position at a preset RPM and then retracting allowing the accelerator pedal to return to its idle position allows the service to be completed as expected on vehicles that would normally go into limp mode. That is, the present invention overcomes the disadvantage that is found in many vehicles that go into a limp mode if the vehicle's engine speed (RPM) is raised above idle for an extended period of time and the vehicle speed sensor (VSS) does not register any movement. This feature of many modern vehicles is designed to combat the perilous situation where an accelerator pedal becomes stuck while a person is driving, where the car engine then automatically decelerates until the vehicle stops. The inventor has found that using the linear actuator to start the service at a selected RPM, and then retracting the linear actuator to slow the engine, and then reinstating the original engine speed will bypass the limp mode feature. This requires that the linear actuator of the present invention be active in both directions to complete the service. Many vehicle services require the vehicle's engine speed be between 2500-3000 RPMs during the service, and this is accomplished easily with the present invention.

In another preferred embodiment, the controller 100 is what is referred to as a "smart actuator" that can both extend the linear actuator shaft 36 as well as retract it. The actuator 34 communicates with the controller 100 via serial or CAN bus, which allows the pedal actuator 10 to be smart in the sense that one can now setup a target RPM range in the logic controller and monitor the engine speed via the OBD II. The logic controller uses the information obtained from the vehicle OBD communication and correct the position of the shaft 36 to maintain the target RPM throughout the service. Using the smart actuator, the linear actuator shaft's full range of motion is controlled, allowing for a much more efficient and safer service.

Testing shows that an engine's speed can be held steady at a desired rate for an extended period of time, allowing the technician to complete the service with no interruptions or MIL's associated with the VSS. With the present invention connected directly to the remote service apparatus via a 4-conductor wire harness, the remote service apparatus can be programmed to select the optimal speed to clean an engine valves while introducing cleaning fluid into the engine.

In a preferred embodiment, the linear actuator 34 is powered by the vehicle's twelve volt DC power as opposed to a compressed air pneumatic device having its own power supply. This eliminates the need for the present invention to carry a dedicated power supply for the invention; rather, the present invention is a preferred embodiment is powered by the remote service apparatus. In another embodiment, the device can be powered using a power source within the vehicle such as a supplied battery, cigarette lighter, USB port, or a cable extending to vehicles battery. This version could include a timing mechanism that is preset to activate at a predetermined time, such as one minute and thirty seconds, and this feature would be incorporated with the actuator.

Certain embodiments have the advantage of eliminating the need for a standalone controller box, since it is preferably controlled via the on-board PCB of the remote service apparatus. It has a dedicated output and portion of the firmware allowing adjustability of the trigger time. The prior art systems operate via a "control box" that requires the technician to setup the pulse time and start the actuation. When the service is complete the technician must manually stop the pedal actuation. The present invention includes embodiments where a "smart unit" is connected to the data port of the vehicle ECU and the remote service apparatus' controller knows the exact state the vehicle's engine during the service. As a result of this, the system can detect if the engine stalls, and if that is the case the automated pedal depressor stops depressing the throttle until the service is restarted.

Figure 6:
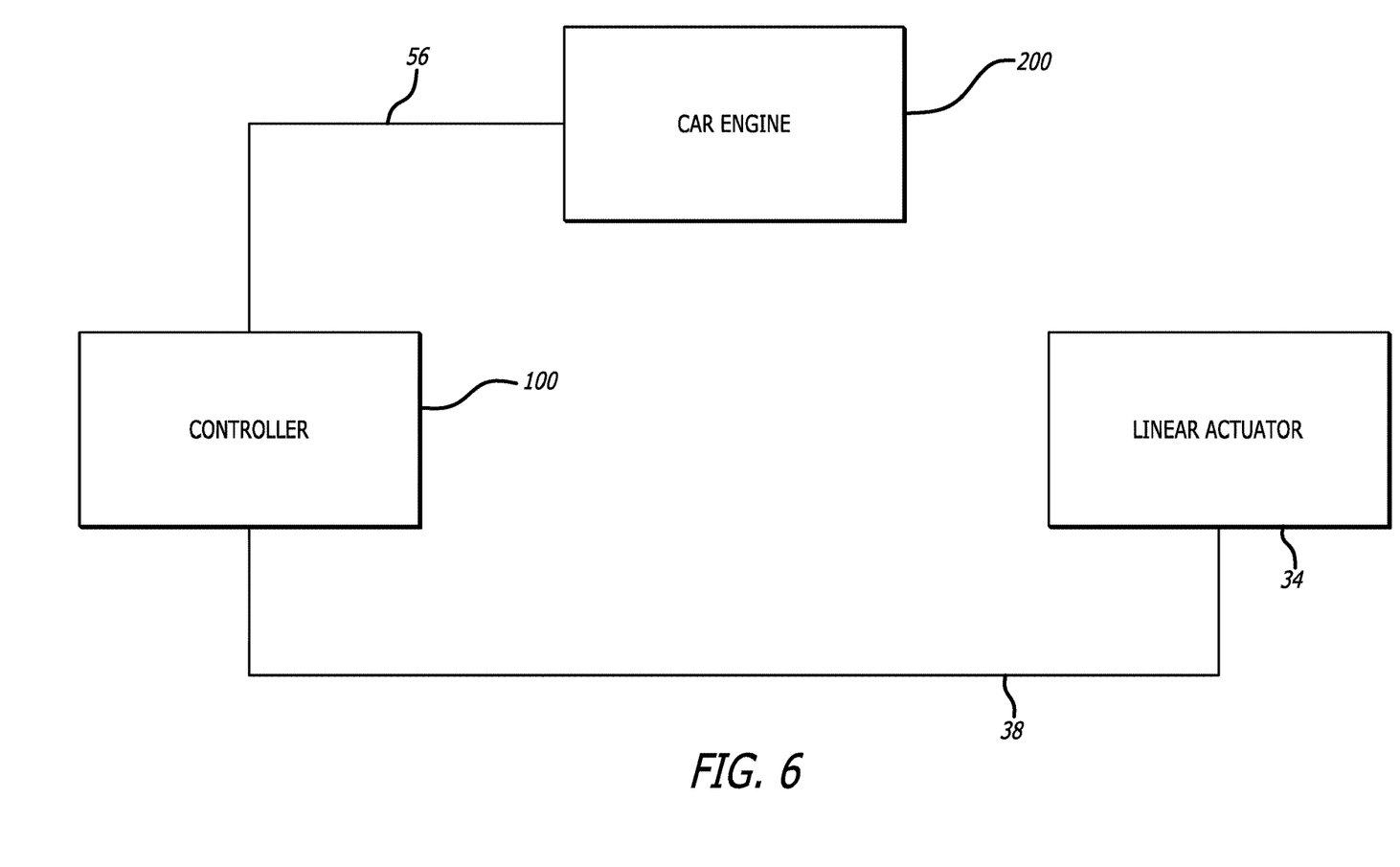
FIG. 6 is a schematic view of the system of the present invention.

FIG. 6 is a schematic diagram of the system of the present invention, where the linear actuator 34 is controlled via leads 38 by the controller 100, which in turn is connected to the vehicle's engine 200 for feedback and to facilitate the service to be performed. It is to be understood that leads 38 can be replaced with a wireless connection that is remote, such as a hand held controller used by the technician or a computer generated commands delivered via a wireless connection.

While certain embodiments of the present invention have been described above and depicted in the drawings, the invention is not limited to any specific depiction or characterization of the invention. A person of ordinary skill in the art will readily recognize and appreciate various modifications and substitutions to the aforementioned embodiments, and the scope of the present invention is intended to encompass all such modifications and substitutions. Accordingly, unless expressly limited, the scope of the present invention is governed entirely by the words of the appended claims using their ordinary meanings, consistent with but not limited to the descriptions and depictions herein.

We claim:

1. A vehicle pedal actuator, comprising:
    an elongate rod;
    an adjustable, releasable steering wheel hook slidably secured to the elongate rod, the steering wheel hook configured to bear against a vehicle's steering wheel;
    a spring biasing the steering wheel hook at a first position, and a tightening mechanism for locking the steering wheel hook at a desired position along the elongate rod;
    a pedal plate adapted to bear against a vehicle pedal;
    a linear actuator connected to the pedal plate and mounted on the elongate rod, the linear actuator configured to withdraw the pedal plate in response to electrical control signals from a revved position; and
    a controller configured to send the electrical control signals to the linear actuator to withdraw the pedal plate from the initial revved position;
    wherein the controller is connected to and cooperates with an onboard diagnostics system on the vehicle to effect a target RPM set at the controller and monitor the engine speed; and
    wherein the linear actuator retracts to stop revving an engine of the vehicle when the controller determines via the onboard diagnostics system that the vehicle engine has stalled.

2. The vehicle pedal actuator of claim 1, wherein the linear actuator is powered by a twelve volt battery that also powers the vehicle.

3. The vehicle pedal actuator of claim 1, wherein the linear actuator extends and retracts from a home position.

4. The vehicle pedal actuator of claim 1, wherein the pedal plate includes a curled upper end.

5. The vehicle pedal actuator of claim 1, including at least one adjustable strap for connecting the pedal plate to the vehicle's pedal.

6. The vehicle pedal actuator of claim 1, wherein the steering wheel hook includes a plate positioned to trap the vehicle's steering wheel between the steering wheel hook and the plate.

7. The vehicle pedal actuator of claim 1, wherein the controller is configured to extend the linear actuator for a predetermined period of time before withdrawing the linear actuator.

8. The vehicle pedal actuator of claim 1, wherein the linear actuator assumes an extended position when the linear actuator is connected to a power supply, and assumes a withdrawn position when the linear actuator is disconnected from the power supply.

* * * * *